(12) United States Patent
Baudart et al.

(10) Patent No.: US 6,318,859 B1
(45) Date of Patent: Nov. 20, 2001

(54) SET OF PROGRESSIVE MULTIFOCAL OPHTHALMIC LENSES

(75) Inventors: Thierry Baudart, Joinville le Pont; Bernard Bourdoncle; Thierry Laloux, both of Paris; Claude Pedrono, Briis Sous Forges; Claire Rossier, Paris, all of (FR)

(73) Assignee: Essilor International, Charenton (FR)

( * ) Notice: Subject to any disclaimer, the term of this patent is extended or adjusted under 35 U.S.C. 154(b) by 0 days.

(21) Appl. No.: 09/254,698

(22) PCT Filed: Sep. 9, 1997

(86) PCT No.: PCT/FR97/01583
§ 371 Date: Jun. 17, 1999
§ 102(e) Date: Jun. 17, 1999

(87) PCT Pub. No.: WO98/12590
PCT Pub. Date: Mar. 26, 1998

(30) Foreign Application Priority Data
Sep. 20, 1996 (FR) .................................................. 96 11478

(51) Int. Cl.[7] .................................................. G02C 7/06
(52) U.S. Cl. ........................................... 351/169; 351/177
(58) Field of Search ..................... 351/168, 169, 351/170, 171, 172

(56) References Cited

U.S. PATENT DOCUMENTS 4,787,733 * 11/1988 Silva ..................................... 351/177

FOREIGN PATENT DOCUMENTS 2 261 527 A   5/1993  (GB).

OTHER PUBLICATIONS

Guilino, "Design Philosophy for Progressive Addition Lenses," *Applied Optics*, 32:111–117, Jan. 1, 1993.

* cited by examiner

Primary Examiner—Scott J. Sugarman
(74) Attorney, Agent, or Firm—Fish & Richardson P.C.

(57) ABSTRACT

The invention concerns a set of progressive multifocal opthalmic lenses, each having a first progressive multifocal surface and a second surface preferably spherical. It proposes to define the set of lenses with regard to the optical characteristics of the lenses, and particularly wearer power and oblique astigmatism, in worn conditions. For this purpose, the invention defines an ergorama associating with each sight direction in worn conditions a target object point, and a given power. This ergorama supplies a power target for a definition by optimisation of the lenses, and is used in a radii plotting programme for calculating the optical characteristics during optimisation. The set of lenses has substantially identical optical performances for a given addition, whatever the power of the far vision reference point.

20 Claims, 13 Drawing Sheets

SET OF PROGRESSIVE MULTIFOCAL OPHTHALMIC LENSES

BACKGROUND OF THE INVENTION

The present invention relates to a set of progressive multifocal ophthalmic lenses; it also relates to a method for determining an ergorama for a set of progressive multifocal ophthalmic lenses, said ergorama providing an association, for each lens, between a point towards which the glance is directed and each direction of glance in the conditions under which the lens is actually worn. Finally, it relates to a method for defining a progressive ophthalmic lens.

Progressive multifocal ophthalmic lenses are now well-known. They are used for correcting long-sightedness and allow wearers of spectacles to look at objects over a large range of distances without needing to take their glasses off. Such lenses typically comprise a far vision region situated in the upper portion of the lens, and a near vision region situated in the lower part of the lens and an intermediate vision region linking the near vision region and the far vision region, together with a main meridian of progression which passes through these three regions.

French Patent 2,699,294 discusses, in its preamble, the various elements of such a progressive multifocal ophthalmic lens together with the work carried out by the present applicant to improve the comfort of wearers of such lenses. Reference should be made to that document for more information on these various points.

The applicant also proposed, for example in U.S. Pat. No. 5,270,745 or 5,272,495 to cause the meridian to vary, and notably to off-center it towards a near vision control point, as a function of power addition and ametropia.

Applicant has also proposed, in order to better satisfy the viewing requirements of long-sighted people and improve progressive multifocal lens comfort, various improvements (French Patents 2,683,642, 2,699, 294, 2,704,327).

Usually, these progressive multifocal lenses comprise a front aspherical face which is the face that faces away from the wearer of the spectacles, and a rear spherical or toroidal face directed towards the wearer of the spectacles. This spherical or toroidal face makes it possible to adapt the lens to the user's ametropia, meaning that a progressive multifocal lens is only generally defined by its aspherical surface. As is well known, such a aspherical surface is generally defined by the height or altitude of all points thereon. Parameters are also used consisting of maximum and minimum curvature at each point, or, more frequently, their half-sum and their difference. The half-sum and difference, multiplied by a factor n−1, n being the refractive index of the lens material, are called mean sphere or power, and cylinder.

Families of progressive multifocal lenses can be defined, each lens in a family being characterised by a power addition, corresponding to a variation in power between the far vision region and the near vision region. More precisely, power addition, referred to as A, corresponds to the variation in power between a point L in the far vision region and a point P in the near vision region, which are respectively referred to as the far vision control point and near vision control point, and which represent points where the glance intersects the surface of a lens for viewing to infinity and for reading vision.

Within the same family of lenses, power addition varies from one lens to another in the family between a minimum and maximum value of power addition. Usually, the minimum and maximum power addition values are respectively 0.75 diopters and 3.5 diopters, and power addition varies by 0.25 diopters steps from one lens to the next one in the family.

Lenses having the same power addition differ by their value of mean sphere at a reference point, also known as the base. One can for example decide to measure the base at the far vision control point L.

Thus, by choosing pairs, (power addition, base) a set of front aspherical faces for progressive multifocal lenses are defined. Usually, one can thus define five values for the base and 12 values for power addition, giving a total of 60 front faces. In each one of the bases, optimization is carried out for a given power.

Using, with one of these front faces, a rear face which is spherical or toroidal and near to the rear face used for optimization, makes it possible to cover all of the requirements of progressive multifocal lens wearers. This known method makes it possible, starting from semi-finished lenses of which only the front faces is shaped, to prepare lenses suited to each wearer, by simply machining a spherical or toroidal rear face.

This method suffers however from the disadvantage of only being an approximation; consequently, the results obtained with a rear face different from the one used for optimization are not as good as those corresponding to the rear face used for the optimization.

U.S. Pat. No. 5,444,503 discloses a progressive multifocal lens in which the rear face is adapted to each wearer, and is constituted by an aspherical surface. This aspherical surface is a not multifocal and appears to be calculated so as to provide the optical power necessary at certain reference points. In that Patent, it is considered the solution would make it possible to overcome the defects arising from replacing the rear space used for optimization by a rear face approximating it.

This solution has the disadvantage of considerably complicating lens manufacture: it implies measurement of the position of the lenses on the the wearer, followed by determination, and machining, of an aspherical rear face.

SUMMARY OF THE INVENTION

The invention provides a progressive multifocal ophthalmic lens having improved aesthetic appeal and which has improved performance over existing lenses while making it possible to preserve the ease with which the semi-finished lenses can be adapted to a wearer. While still conserving this ease of implementation, the invention provides adaptation of lenses by simple machining of the rear face which does not lead to a defect in vision even when the rear face is different from the rear space used for optimization.

More precisely, the invention provides a set of progressive multifocal ophthalmic lenses determined by means of ergoramas which associate, for each lens, a point towards which the glance is directed with each direction of glance, under wearing conditions, in which, for a lens under the conditions in which it is worn, a wearer power is defined in a direction of glance and for an object point, as the sum of the the degree of nearness of an object and the degree of nearness of the image of said object point, in which each one of said lenses has:
   a first and a second surface, said first surface being a progressive multifocal surface;

a far vision region, a near vision region and a main meridian of progression passing through said two regions, said far vision region, near vision region and meridian being sets of directions of glance under the wearing conditions;

a power addition A equal to a variation in wearer power for the point towards which the glance is directed in the ergorama, between a reference direction of glance in the far vision region and a reference direction of glance in the near vision region;

and in which variations in wearer power along said meridian, for the said point towards which the glance is directed in the ergorama are substantially identical for each one of the lenses of a set having the same power addition.

According to one embodiment, said lenses each have a prescribed power addition selected within a discrete set, a difference in power addition A between two lenses of said set having the same prescribed power addition being less than or equal to 0.125 diopters.

Advantageously, with astigmatism aberration in a direction of glance, under wearing conditions, being defined for an object point, for each lens, along said meridian, astigmatism aberration for a point towards which the glance is directed in the ergorama is less than or equal to 0.2 diopters.

According to a further embodiment, with astigmatism aberration in a direction of glance, under wearing conditions, being defined for an object point, for each one of said lenses under wearing conditions, angular width in degrees between lines for which astigmatism aberration for points on the ergorama is 0.5 diopters, at 25° below a mounting cross on said lens, has a value greater than 15/A+1, A being the power addition.

Advantageously, with astigmatism aberration in a direction of glance under wearing conditions being defined for an object point, for each one of said lenses under wearing conditions, an angular width in degrees between lines for which astigmatism aberration for points on said ergorama is 0.5 diopters, at 35° below a lens mounting cross, has a value greater than 21/A+10, A being the power addition.

According to one embodiment, with astigmatism aberration in a direction of glance under wearing conditions being defined for an object point, for each one of said lenses under wearing conditions, a solid angle bounded by lines for which astigmatism aberration for points in said ergorama equals 0.5 diopter, and points situated at an angle of 45° with respect to a mounting cross on said lens has a value greater than 0.70 steradians According to a further embodiment, for each one of said lenses under their wearing conditions, wearer power difference in the far vision region, in each direction of glance, between a point towards which the glance is directed in said ergorama and object points the degree of nearness of which differs from the degree of nearness of said point towards which the glance is directed by between 0 and 0.5 diopters, is less than or equal to 0.125 diopters as an absolute value.

Advantageously, for each one of said lenses under their wearing conditions, wearer power difference in the near vision region, in each direction of glance, between a point towards which the glance is directed in said ergorama and object points the degree of nearness of which differs from the degree of nearness of said point towards which the glance is directed by an absolute value of less than 1 diopter, is less than or equal to 0.125 diopters as an absolute value.

According to a further embodiment, in which, with astigmatism aberration and direction of glance under wearing conditions being defined for an object point, for each one of said lenses under wearing conditions, a difference in astigmatism aberration in the far vision region, in each direction of glance, between a point towards which the glance is directed in said ergorama and object points the degree of nearness of which differs from the degree of nearness of said point towards which the glance is directed by between 0 and 0.5 diopters, is less than or equal to 0.125 diopters as an absolute value.

Advantageously, with astigmatism aberration and direction of glance under wearing conditions being defined for an object point, for each one of said lenses under wearing conditions, a difference in astigmatism aberration in the near vision region, in each direction of glance, between a point towards which the glance is directed in said ergorama and object points the degree of nearness of which differs from the degree of nearness of said point towards which the glance is directed by an absolute value of less than 1 diopter, is less than or equal to 0.125 diopters as an absolute value.

A method for determining an ergorama for a set of progressive multifocal ophthalmic lenses is also provided, said ergorama associating, for each lens, a point towards which the glance is directed with each direction of glance under actual wearing conditions, comprising the steps of defining standard characteristics of a wearer, and notably ametropia and power addition;

defining an environment in the form of a set of object points to be looked at, for the standard wearer;

calculating the direction of glance for a reference object point for near vision, using a thin lens approximation, for a power calculated from said ametropia and said power addition;

calculating accommodation from the direction of glance for said reference object point for near vision and from the distance between pupils;

determining the wearer's Donders curve, from accommodation and convergence for said reference object point for near vision;

determining a direction of glance for other object points in an environment, using an iterative process, for a thin lens approximation, based on said Donders curve.

The step of determining the direction of glance for other object points in said environment can comprise, for each one of said other points:

calculating a convergence without a lens;

calculating accommodation from the Donders curve;

calculating a power using a thin lens approximation;

repeating, to convergence to one direction of glance, the steps consisting of:

determining deviations brought about by a thin lens of the calculated power;

determining a direction of glance making it possible to compensate said deviations with said thin lens of the calculated power;

calculating a convergence from the new direction of glance;

calculating a power, using a thin lens approximation, from the new convergence and the Donders curve.

Additionally, for each lens, a wearer power can be associated with each direction of glance under wearing conditions, said wearer power being a last power calculated, using a thin lens approximation, during said steps of repetition until convergence is reached.

A method for defining a progressive ophthalmic lens by optimizing the optical characteristics of an ophthalmic lens is also provided, said optical characteristics being calculated during optimization using a ray tracing program, under wearing conditions.

These optical characteristics can be a wearer power and astigmatism aberration, under wearing conditions.

Wearer power for an object point can be defined as the sum of degree of nearness of the image and the degree of nearness of an object.

In one embodiment, optimization consists of minimizing, by iterations, differences between optical characteristics of the lens and target values, and in which values of wearer power obtained according to the method of claim 14 are used as target values for wearer power using, as target values for astigmatism aberration, values for astigmatism for a lens having a first known progressive surface with a surface power addition equal to a target wearer power addition for an ophthalmic lens to be defined, and a second spherical surface such that power at a far vision reference point is zero.

As a starting lens for optimization, a lens can be employed having a first known progressive surface with a surface power addition equal to a target wearer power addition for an ophthalmic lens to be defined, and a second spherical surface.

Finally, optimization can consist in varying a variable aspherical layer that is added to said starting lens Further advantages and characteristics of the invention will become more clear from a reading of the description which follows of some embodiments of the invention provided by way of example, and with reference to the attached drawings.

DETAILED DESCRIPTION OF PREFERRED EMBODIMENTS

In a manner known per se, we define a mean sphere for every point on the surface, given by the formula:

$$D = \frac{n-1}{2}\left(\frac{1}{R1} + \frac{1}{R2}\right)$$

where R1 et R2 are the maximum and minimum radii of curvature expressed in meters, and n is the refractive index of the material constituting the lens.

A cylinder D is also defined, given by the formula $$C = (n-1) \cdot \left|\frac{1}{R_1} - \frac{1}{R_2}\right|$$

Figure 1:
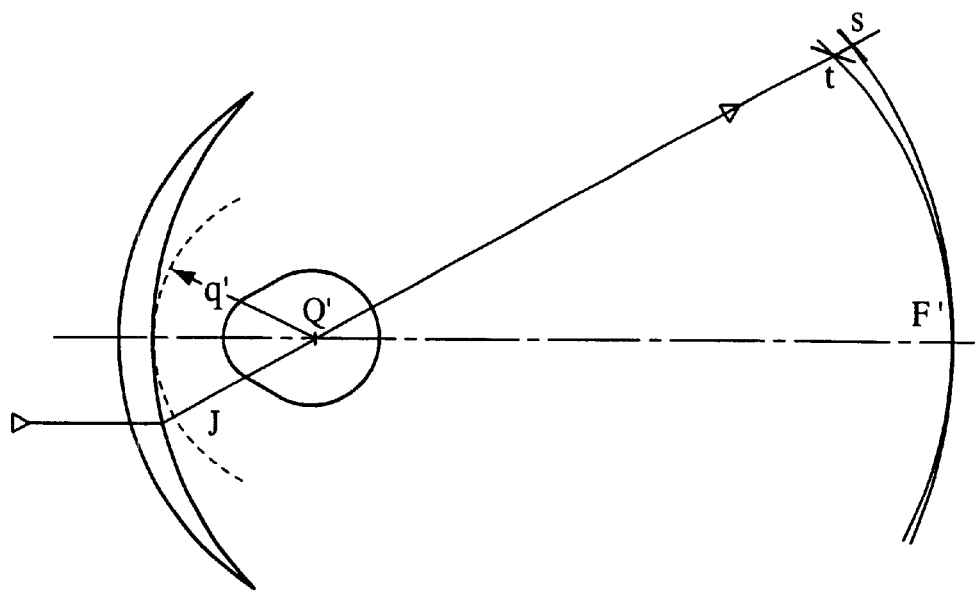
FIG. 1 shows an eye and lens optical system

The invention proposes defining the characteristics of lenses not only in terms of a mean sphere or cylinder, but rather to take the situation of the wearer of the spectacle lenses into consideration. FIG. 1 shows, to illustrate this, an eye and lens optical system shown diagrammatically.

In FIG. 1, the mean plane of the lens is inclined with respect to the vertical by an angle which corresponds to the usual inclination of spectacle frames. This angle is for example 12°.

We shall call Q' the center of rotation of the eye, and define a sphere of vertices centered on Q' of radius q', which is tangential to the rear face of the lens at a point on the horizontal axis.

As an example, a common value for radius q' is 27 mm, and this gives satisfying result when the spectacles are worn.

A given direction of glance corresponds to a point J on the sphere of vertices and can also be defined in space, in spherical coordinates, by two angles alpha and beta. Angle alpha is the angle between straight line Q'J and the horizontal plane passing through point Q' while angle beta is the angle between the straight line Q'J and the vertical plane passing through point Q'.

A given direction of glance corresponds to a point J on the sphere of vertices or to a pair of values (alpha, beta). In the object space, for a point M on the corresponding light ray, the degree of nearness of an object, PO, is defined as being the inverse of the distance MJ between point M and point J on the sphere of vertices:

PO=1/MJ

This makes it possible to calculate the degree of nearness of an object in the framework of a thin lens approximation at every point of the sphere of vertices, which is used for determining the ergorama, as will be explained below. For an actual lens, it is possible, using a ray tracing program, to consider the degree of nearness of an object as being the inverse of the distance between the object point and the front surface of the lens, on the corresponding ray. This is described in more detail below in the description of the optimization process.

Still for the same direction of glance (alpha, beta), the image of the point M having a given degree of nearness is formed between two points S and T corresponding, respectively, to a minimum and maximum focal length (which would be the sagital and tangential focal length in the case of surfaces of revolution). The quantity:

$$PI = \frac{1}{2}\left(\frac{1}{JT} + \frac{1}{JS}\right)$$

is called the degree of nearness of the image of point M.

By analogy with the case of the thin lens, one thus defines, in a given direction of glance and for a given degree of nearness of an object, i.e. for a point in object space on the corresponding light ray, an optical power as being the sum of of the degree of nearness of the image and the the degree of nearness of an object.

Using the same notation, in each direction of glance and for a given the degree of nearness of an object, an astigmatism aberration (aberration due to astigmatism) AA. is defined as being $$AA = \left|\frac{1}{JT} - \frac{1}{JS}\right|$$

This astigmatism aberration corresponds to the astigmatism of the light beam created by the aspherical front surface and the rear spherical surface.

Thus, two possible definitions of optical power and astigmatism aberration of the lens are obtained according to the invention, under wearing conditions. Other definitions could also be used, but the above have the advantage of being defined simply, and of being readily calculated using a ray tracing program for a given lens.

Additionally, according to the invention, an ergorama is defined which gives, for each direction of glance, the degree of nearness of an object and a wearer power. The ergorama is defined for a given situation of the wearer, in other words for an ametropia-power addition pair.

The ergorama is thus a function that maps four variables: ametropia, power addition and direction of glance in the form of angles alpha and beta, to two values: the degree of nearness of an object and a wearer power.

The ergorama thus defined can be determined by physiological, ergonomic and postural tests, and by knowledge of the laws of optics. One can notably consider:

prismatic deviation introduced by the power encountered on the lens determined by Prentice's rule (prism= H*Power). Prismatic deviations modify the position of the eyes and of the head in different ways depending on ametropia;

subjective accommodation used as a function of the prescribed power addition, of ametropia and of the degree of nearness of an object. This accommodation is calculated using the improved Donder's law that relate convergence (or apparent nearness of the object) and accommodation thereby ensuring normal binoculars vision; for more details of this law, reference can be made to FIG. 4 described below;

a reduction in visual acuity as a function of age which can be reflected by a moving nearer of near vision distance when the power addition increases;

postural preferences of wearers in a given environment which determine the position of the head and of the eyes for near vision work and the visual-motor strategy employed to describe this environment.

By way of example, we shall describe one way of determining the ergorama, for any given ametropia, for example by a power at point L for near vision, and for a given power addition.

According to the invention, one can proceed in the following manner: firstly, the direction of glance and the power are determined for viewing the near vision point. From this, the slope of the Donders half-line can be obtained. This, associated with a scanning strategy makes it possible to determine power for other directions of glance.

Figure 2:
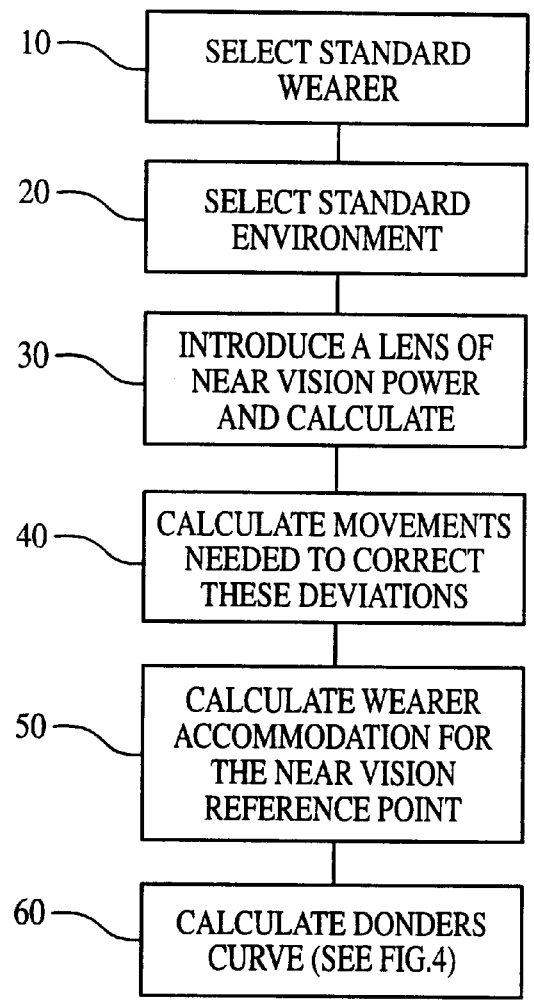
FIG. 2 is a flow chart of the various steps in defining the reference point for near vision and calculating the Donders curve for the wearer.

We shall now explain in more detail this way of determining an ergorama, with reference to FIGS. 2 to 5, for a left-hand lens. FIG. 2 is a flow chart showing the various steps in defining the near vision control point and for calculating the Donders curve for the wearer.

As explained above, we shall start out by determining the direction of glance and the power in order to view the near vision point.

To achieve this, we choose the characteristics of the standard wearer, step 10 in FIG. 2. One can for example consider that the standard wearer has the following characteristics: he is isomemetropic and orthophoric, both eyes accommodate by the same amount and move by the same amount in case of version and in a symmetrical manner in the case of vergenc; the distance between the pupils is 65 mm, the distance between the lens and the center of eyeball rotation is 27 mm, the distance between the center of rotation of the eyeball and the center of rotation of the head is 100 mm., and the pantoscopic angle is 12°. The center of eyeball rotation is the point marked Q' on FIG. 1.

Head inclination is given by the position of the Francfort plane with respect to the horizontal, as explained in French Patent applications 2,683,642 and 2,683,643 is the name of the present applicant.

For near vision work, the standard lowering of the eyes is 33° and lowering of the head is 35° so that the work plane can be parallel to the mean vertical horopter.

Next, a working environment is chosen, step 20, FIG. 2, in order to position there the standard wearers chosen in step 10. One can for example choose a place of work in an office described by a document of known format (A4 for example) placed on a horizontal work surface also of known dimensions. The central point M situated two-thirds of the way up from the bottom of this document is a place where the wearer naturally lets his glance fall and will constitute a first point of reference for near vision.

This point M is placed at the near vision distance given by the power addition and for a standard total inclination of the glance of 68°, i.e. the sum of 33° and 35°, with respect to the horizontal.

We have thus positioned the standard wearer in a given environment. This positioning only depends on the characteristics of the wearer and notably ametropia and power addition.

At step 30 in FIG. 2, a lens is introduced and the variations in the direction of glance brought about by the presence of this lens are calculated. The corresponding calculations are made using a thin lens approximation, at all points on the sphere of vertices. In other words, at every point on the sphere of vertices, an infinitesimal thin lens is considered the axis of which passes through the optical center of rotation of the eye.

Figure 3:
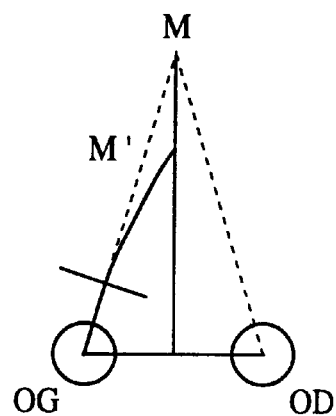
FIG. 3 shows both eyes diagrammatically and the direction of glance.

FIG. 3 shows diagrammatically the right eye OD and the left eye OG and, in dotted lines, the direction of glance for looking at the near vision reference point M. It is known that the power addition of the wearer, in the direction corresponding to the glance for point M, is equal to the sum of far vision power power and power addition. When a thin lens having a corresponding power is introduced into the path, shown in dotted lines, of the glance on the sphere of vertices, the rays undergo deviation as shown by the solid line on FIG. 3, and so that the point on which the glance falls is no longer point M but rather point M'. FIG. 3 is a plan view: it is however clear that deviation is brought about not only in a horizontal plane, but also in a vertical plane.

The inclination determined at step 20 is thus modified by introducing glass into the optical path, as a result of prismatic deviations induced by the power encountered at the lens which should be equal to the power VL prescribed, to which the prescribed power addition is added.

At step 40 in FIG. 2, eye movement and possibly head movement, making it possible to correct these prismatic deviations, are determined. For example, it can be considered that vertical prismatic deviation is compensated for by a vertical movement of the eyes and by movements of the head in order to fix the glance on this point. The part that each plays in this compensation depends on the wearer's ametropia. For powers VL less than −2 diopters, it is considered that compensation is totally provided for by the eyes. For an ametropia of +2 diopters and above, the part that the head plays in compensation is total, in other words the eyes do not move. For powers VL between −2 diopters and +2 diopters, it is considered that the part the head plays in compensation increases linearly: in other words, for a powers VL of −1 diopter, vertical prismatic deviation is compensated for to an extent of 75% by eye movement and 25% by head movement.

We consider that horizontal prismatic deviation is fully compensated for by eye movement bringing about a modification to convergence.

The calculations are again performed with the thin lens approximation at every point on the sphere of vertices, as explained with reference to step 30.

At the end of step 40, the eye movements and, possibly, head movements making it possible to correct these prismatic deviations have been determined and, consequently, the direction of glance for viewing the near vision reference point.

Thanks to this, those points on the lenses where power should be equal to the prescribed power V L supplemented by the prescribed additions are known. Also, the exact positioning of the wearer is known through the eye and head movements needed for the compensation. We have also determined the positions of the centers of rotation of the eyes and of the head with respect to the document and thus to the working surface.

At step 50 in FIG. 2, the wearer's subjective accommodation is calculated from the position thus determined. In fact, the power at the lens, the position of the lens in front of the eye and the object distance for viewing the near vision reference point are known.

Subjective accommodation is deduced with the help of the formula:

wearer power=degree of nearness of an object−accommodation which corresponds to the thin lens approximation performed at every point on the sphere of vertices.

At step 60 in FIG. 2, knowing this accommodation, and the direction of glance, the Donders law applicable to the wearer is determined. This law supplies, as a function of age, a relation between convergence and accommodation.

Figure 4:
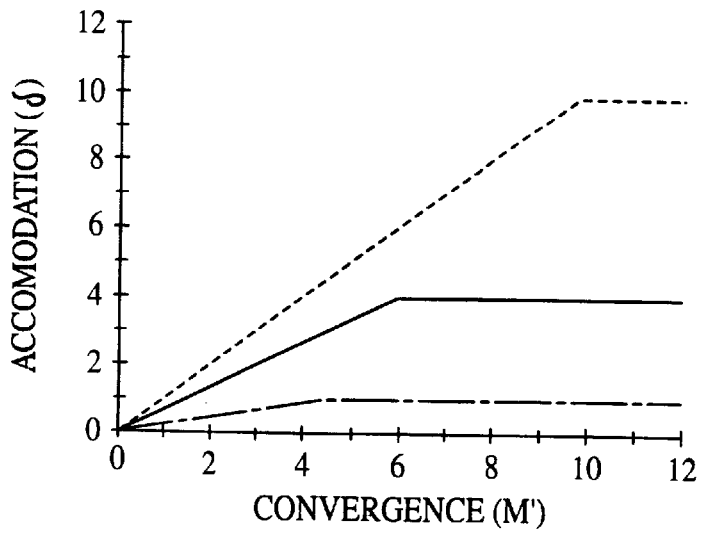
FIG. 4 illustrates Donders law graphically.

FIG. 4 shows Donders law graphically. The x-axis shows convergence in $m^{-1}$, and the y-axis shows accommodation in diopters. The dashed-line curve shows the relation between these two values for a younger spectacle wearers (age 25). The solid line curve and dash-dot curves respectively show the relation between these two values for spectacle wearers aged 41 and 50.

Knowing, for the near vision reference point, accommodation and convergence, the slope of the linear portion of the Donders curve is calculated.

The limit of the horizontal portion of the Donders curve is given by the wearer's maximum accommodation which depends on age. Age is linked to power addition on the basis of clinical studies.

One hence knows, following step 60 in FIG. 2, the straight-line Donders curve which will now allow us to relate subjective accommodation to convergence, for the selected wearer.

This enables a complete definition of the wearer and of his position in his environment to be obtained. Next, for every direction of the eyes and thus for every point on the lens, an associated power and the degree of nearness of an object are obtained, by scanniing over the wearer's environment, as explained with reference to FIG. 5.

For this, a strategy is set for scanning the environment and for the rules of compensation of the prismatic deviations by the head and eye movements. In order to scan a document, one can say in general terms that the wearer only moves his head in order to compensate for the vertical prismatic deviation according to the rule set out above. The major part of the document scanning is thus achieved by eye movements.

Above the document, the head and the eyes move simultaneously in order to reach a final position so that eye inclination is zero when head inclination is zero.

Additionally, beyond the working surface, object distance is linearly interpolated at the vertical position of the eyes in orbits between the distance of the edge of the work surface and infinity, which is the object distance for far vision (zero head and eye inclination).

A strategy for scanning the environment is thus defined, in other words a set of points that are viewed in the environment, and associated eye and head positions.

For each one of these points, knowing the degree of nearness of an object, the direction of glance and the necessary power are determined, as will now be explained with reference to FIG. 5.

At step 100, a point in the environment is taken. Advantageously, the environment is described in terms of angular coordinates the origin of which is the center of rotation of the eye for the lens for which the calculations are being performed, and the scanning is done in an incremental fashion one degree at a time, starting out from the lowest possible position (80°) in the sagittal plane.

At step 110, for this point in the environment, convergence is calculated in the absence of a lens: in effect, the distance between the point and the center of rotation of the eyes as well as the distance between the wearer's pupils are known.

At step 120, knowing this convergence and the wearer's Donders curve, an accommodation is determined and the necessary power at the lens is calculated. In fact, the Donders curve gives accommodation as a function of convergence; power is calculated using the thin lens approximation as explained above with reference to step 50 of FIG. 2.

Figure 5:
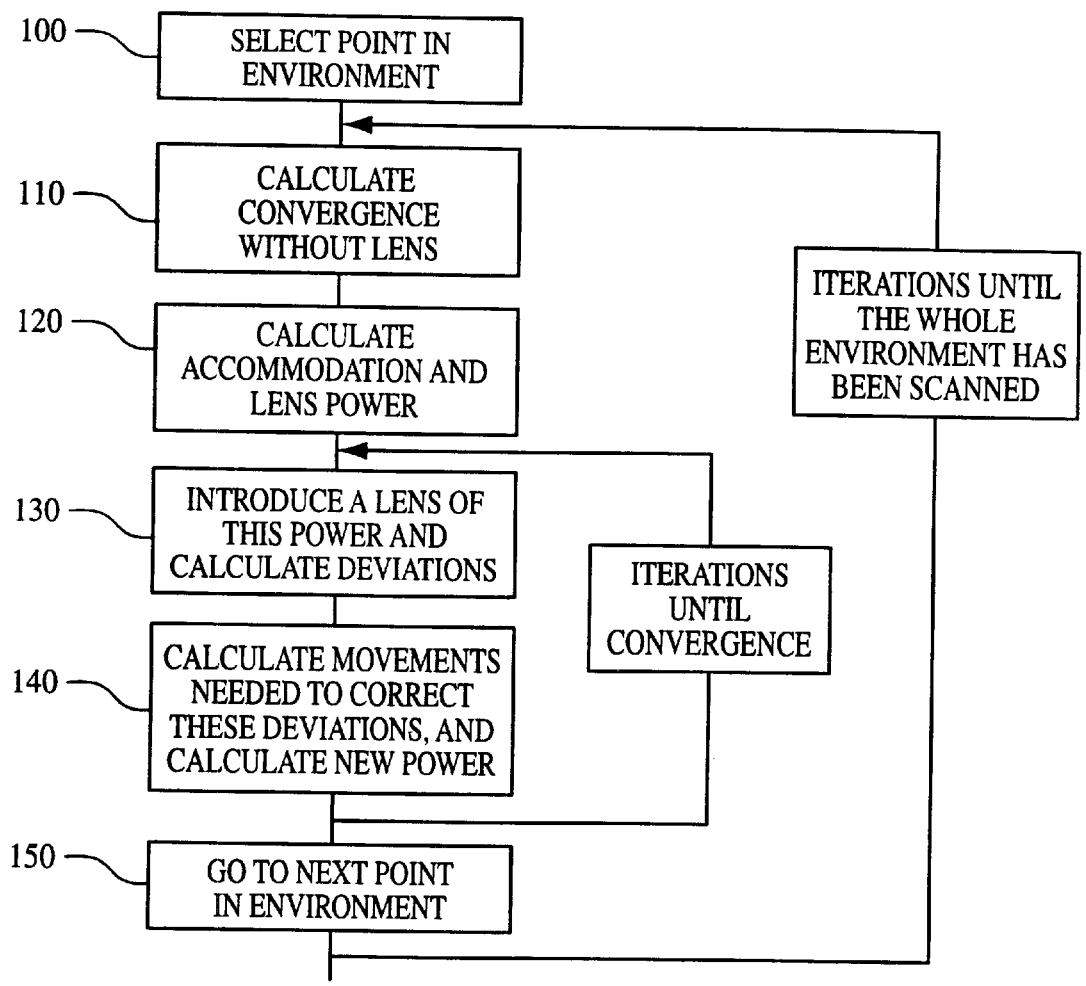
FIG. 5 is a flow chart of the various steps in calculating ergorama outside the reference point for near vision.

Step 130 in FIG. 5 corresponds *mutatis mutandis* to step 30 in FIG. 2. At step 130, the introduction of the lens having the power determined at step 120 leads to prismatic deviation which requires, in order to compensate eye and head movement, a modification in the distance of the point viewed and of convergence. Just like in step 30, the calculations are performed using the thin lens approximation at every point on the sphere of vertices.

At step 140, the new accommodation and the new power, brought about by these modifications, are calculated.

Next, there is a return to step 130, using the new power calculated. By means of repeated iterations, in other words by repeating steps 130 and 140, errors in direction of glance are minimised and the final result is a power for which the system is stable. In practice, the calculations converge generally after 10 to 15 iterations.

For this power, there is a corresponding head position and eye position in the orbits which gives the place on the lens where this power should be situated in order to view the point in the environment selected at step 100.

We have thus determined, for a direction of glance, the degree of nearness of an object and a lens power, making it possible to view a given point in the environment.

At step once 150, we proceed to the next point in the environment following the scanning strategy explained above, before returning to step 110.

In this way, at the end of scanning, a table of values is obtained for the right eye and a table of values for the left eye containing, for each angular position of the eye in the orbit and thus for each point on a lens, a power and an associated object distance.

We have thus calculated, for the standard wearer, in a given environment, and for any given ametrpia and power addition, power and nearness for each direction of glance.

In this way, the ergorama can be determined. For example, the calculations described above are performed for power addition values varying in 0.25 per steps between 0.50 and 3.5 diopters, and for far vision power values varying in 0.50 steps between −12 and +12 diopters.

Thus, the ergorama can be determined for varying ametropias and power additions. To sum up, one proceeds as follows:
- the standard characteristics of a wearer are defined, notably ametropia and power addition;
- an environment, in other words a set of points of to be viewed, is defined;
- the direction of glance for the near vision point is calculated, using the thin lens approximation at every point on the sphere of vertices, for a power deduced from ametropia and power addition;
- from this, the wearer's Donders curve is deduced, relating accommodation and convergence;
- the direction of glance and power for other points in the environment are determined by an iterative process, using the thin lens approximation at every point on the sphere of vertices, using the Donders curves.

This definition of the ergorama additionally makes it possible to define, on a lens, a main meridian of progression from a set of directions of viewing. The main meridian of progression is advantageously defined from the ergorama and corresponds, for a given ametropia and power addition, to the set of directions of glance corresponding to points in the environment situated in the sagittal plane.

One can obviously use other definitions of the main meridian of progression.

Figure 6:
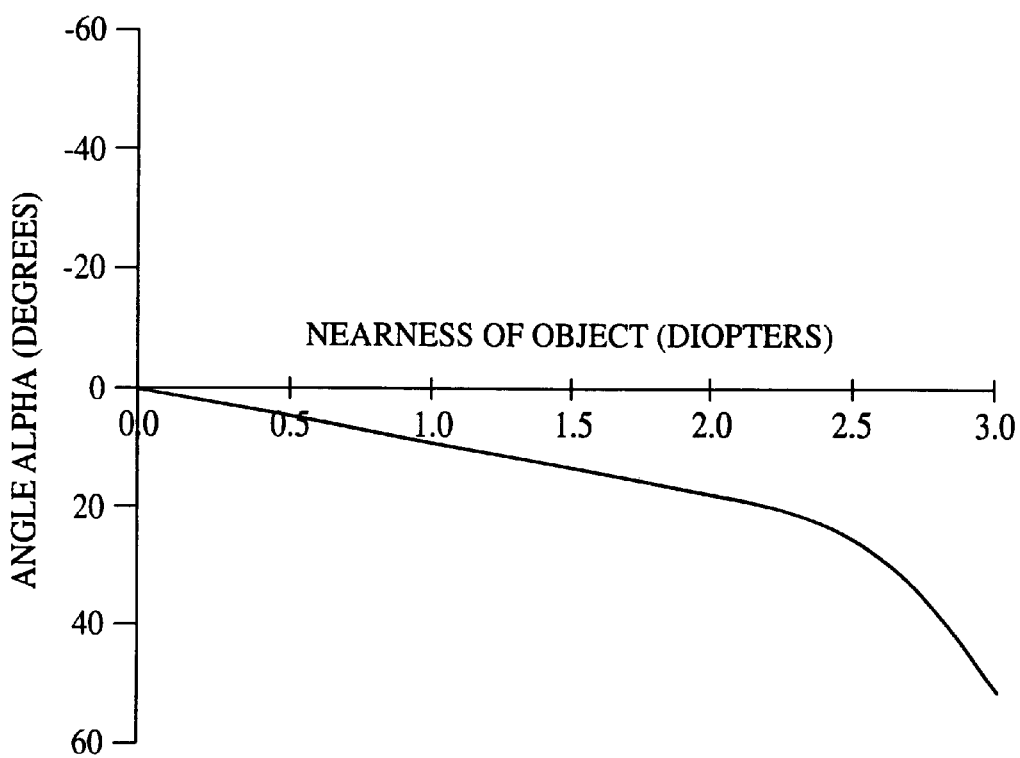
FIG. 6 shows a typical pattern for an ergorama, in diopters.

FIG. 6 shows the typical form of an ergorama along the meridian, in diopters, as a function of the angle alpha between the direction of glance and the horizontal plane passing through the point Q', for an ametropia corresponding to zero power in far vision, and a power addition of 2.00 diopters. On FIG. 6, only variations in the ergorama as a function of the angle alpha have been shown. In fact, as a first approximation, one can reasonably consider that the ergorama is only a function of angle alpha and that it only varies slightly as a function of angle beta. Typically, the ergorama is zero at the far vision control point and has a value of the order of 2.5 to 3.5 diopters at the near vision control point.

The invention proposes that one considers, for optimizing the aspherical face of a lens, values of optical power and astigmatism aberration rather than values of mean sphere and cylinder. Taking these optical values into account rather than surface values provides for a better definition of the aspherical face of lenses and better preservation of the optical properties of the lenses, for a constant power addition, with differing powers.

Figure 7:
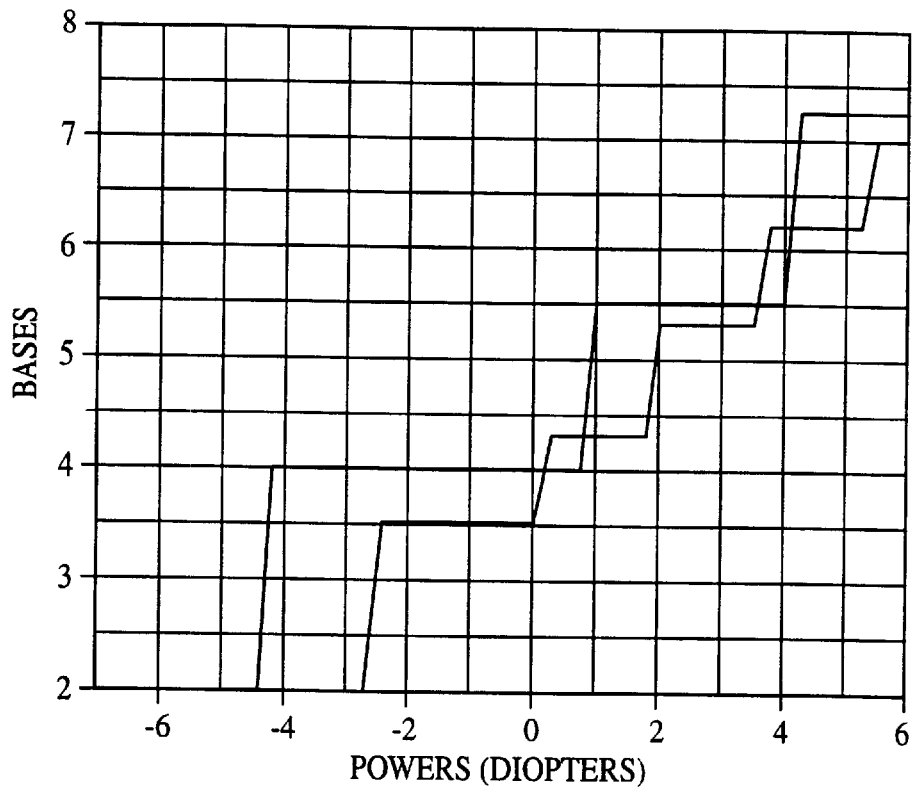
FIG. 7 is an example of a basic cut which can be used for providing lenses according to the invention.

FIG. 7 shows an example of the base cut which can be employed for providing lenses according to the invention, FIG. 7 shows, on the y-axis, the value of the bases and on the x-axis, the corresponding optical power values at the reference point. As shown on FIG. 7, one can use, for defining lenses, base values of 2, 3.5, 4.3, 5.3 and 6.2 diopters. For a value of optical power, in other words for a value on the x-axis of FIG. 7, the base value shown on FIG. 7 is taken as the appropriate value. This choice of five basic values hence makes it possible to cover all wearer optical powers between −6 and +6 diopters.

The invention proposes defining lenses using a program for optimizing optical parameters of lenses, with the following characteristics.

A merit function to be used for optimization is selected by choosing a target and weighting the various regions of the target.

The target is described, for a given ametropia, by a choice of the far vision power, and for a given power addition.

Regarding power, the wearer power given by the ergorama, for the selected ametropia and power addition, is considered as a target.

Regarding astigmatism aberration, the results supplied by performing measurements on a prior art lens can be used as a target, such as for example, the lenses marketed by the applicant under the "Comfort" trademark. More precisely, for the given ametropia and power addition, we consider a known lens having the same power addition, and zero power at the far vision control point. This gives us a known lens having the selected power addition and ametropia.

Using the ray-tracing program, measurements are made on this lens of astigmatism aberration as defined above, under wearing conditions and, starting out from the nearness values given by the ergorama. We can consider the wearing conditions defined in FIG. 1. We thus obtain, in each direction of glance, given by a value pair (alpha, beta) a value for astigmatism aberration.

These values can be modified, for further increasing the performance, by decreasing the values for astigmatism aberration obtained in the lateral regions, for widening the far vision region and the near vision region.

We then consider a target lens having the following optical characteristics:
- along the meridian, defined by the ergorama, a power given by the ergorama and zero astigmatism aberration;
- away from the meridian, a power given by the ergorama and an astigmatism aberration measured on the corresponding lens of the prior art, modified if necessary.

We thus have, for each direction of glance, a value for wearer power and astigmatism aberration, provided by the target lens.

The aim of the optimization program, starting out from a lens to be optimized, is to come as near as possible to the target lens. For this, we can consider a merit function which represents the deviations between the lens to be optimized and the target lens, defined as follows. For a set of points on the lens, or on the sphere of vertices, or, yet again, of the directions of glance, identified by a variable i, we consider the merit function in the form:

$$\Sigma p_i \cdot \Sigma w_{ij} \cdot (V_{ij} - C_{ij})^2$$

where $p_i$ is a weighting of the point i;

$V_{ij}$ is the value of the j-th type of parameter at the point i;

$C_{ij}$ is the target value of the j-th type of parameter at the point i;

$w_{ij}$ is the weighting of the j-th type of parameter at the point i.

One can for example achieve suitable results by taking a set of 700 points distributed along the meridian (70 points) and over the remainder of the lens, with a higher concentration around the meridian.

The value j can be set to 2 and we can use parameters which are wearer power and astigmatism aberration, as defined above.

The weighting $p_i$ of points i makes it possible to apply a higher or lower weighting to various regions of the lens. It is preferable to apply a higher weighting at the meridian and to decrease the weighting as one moves away from the meridian.

The value $V_{ij}$ is measured for point i by a ray tracing program, using the definitions of wearer power and of astigmatism aberration given above, starting from the value of degree of nearness supplied by the ergorama. $V_{i1}$ is the value of wearer power measured at the point i and $V_{i2}$ is the value of astigmatism aberration measured at point i.

More precisely, we can proceed in the following manner. In the alpha, beta direction of point i, using the ray tracing program, we construct the ray departing from the center of rotation of the eye and which enters through the rear face of the lens, passes through the lens and out through the forward face, terminating in the object space. Next, the object point located on the ray thus traced at a distance from the front face of the lens equal to the inverse of the the degree of nearness of an object given by the ergorama for the alpha, beta direction is considered. Starting from of this object point, a plurality of rays, for example three are traced towards the lens, in order to reconstruct the points J and T in FIG. 1; it this way, an exact evaluation of the image obtained for a given object point is achieved. In this way, degree of nearness of the image and astigmatism aberration $V_{i2}$ are calculated. Using the ergorama and calculated degree of nearness of the image, the wearer power $V_{i1}$ in the direction alpha, beta is determined.

The values $C_{ij}$ are target values: in the example, $C_{i1}$ is the wearer power value and $C_{i2}$ is the value of astigmatism aberration at the point i. $w_{ij}$ is the weighting of the j-th type of parameter at point i. One can thus privilege, for a given point, wearer power or astigmatism.

In this way we define a target and a merit function representative of the deviations of the optical characteristics of a lens compared to this target. Such a merit function is clearly positive and should be minimised during the optimization process.

To proceed with optimization, all one needs to do is to select a starting lens and a method of calculation making it possible to decrease, by iterations, the value of the merit function.

For the method of calculation, a damped least squares method can be used or any other optimization method known per se.

For a given ametropia and power addition, we can take as the starting lens, a lens from the prior art having an aspherical face of the same power addition, and a base value at the far vision control point equal to that given by the curve in FIG. 7; we associate with this aspherical face, a spherical face that makes it possible to obtain the desired ametropia, for a given thickness at the center. Thus, for a given power, the lens of the invention has a flatter front surface than a conventional prior art lens.

In order to proceed with optimization, one can advantageously start out from this starting lens, adding a layer to be optimized to a spherical surface and then only modifying this layer in the optimization process. For example, a Zernike polynomial model can be used for this layer; this makes it possible to facilitate calculation in the ray tracing, the Zernike polynomial being rewritten in terms of altitude at the end of the optimization process, thereby providing a map of the altitudes of points on the aspherical face.

One thus obtains, for the given ametropia and for a given power addition, an optimized lens, after iterations of the optimization program. Using a damped least squares method, the merit function defined above and such a starting lens, some tens of iterations are sufficient to achieve, in the majority of cases, a lens having excellent performance.

To avoid the need to proceed with optimization for each each ametropia-power addition pair of values, one may choose to only carry out optimization for central power values at each horizontal step of the curve in FIG. 7. Then, for neighbouring powers, an aspherical layer calculated in the optimization program is simply added to the starting lens. A posteriori, a check is carried out to ensure that the optical performance obtained is correct, in other words near to the corresponding target. Thus, in the example of the base cut in FIG. 7, optimization is only done for all wearer optical powers between −2.5 and 0 diopters, which correspond to a base value of 3.50 diopters.

The invention makes it possible to obtain practically identical results regardless of the wearer optical power, for a given power addition.

The FIGS. below show examples of lenses according to the invention and known lenses. In the description that follows, we shall use the following definition of the far vision region, intermediate vision region, and near vision region: these regions are defined as all of the directions of glance or all corresponding points on the lens for which astigmatic aberration is below 0.50 diopters. The term iso-astigmatism line refers to lines consisting of points for which astigmatism aberration has a constant value. The viewing area in the far vision region is then the surface swept by the glance in the far vision region, in other words between 0.5 diopter iso-astigmatism lines, the edge of the lens and above the geometric center thereof.

The width of the near vision field is then the angular width at near vision control point height on the lens, between 0.5 diopter iso-astigmatism lines.

Figure 8:
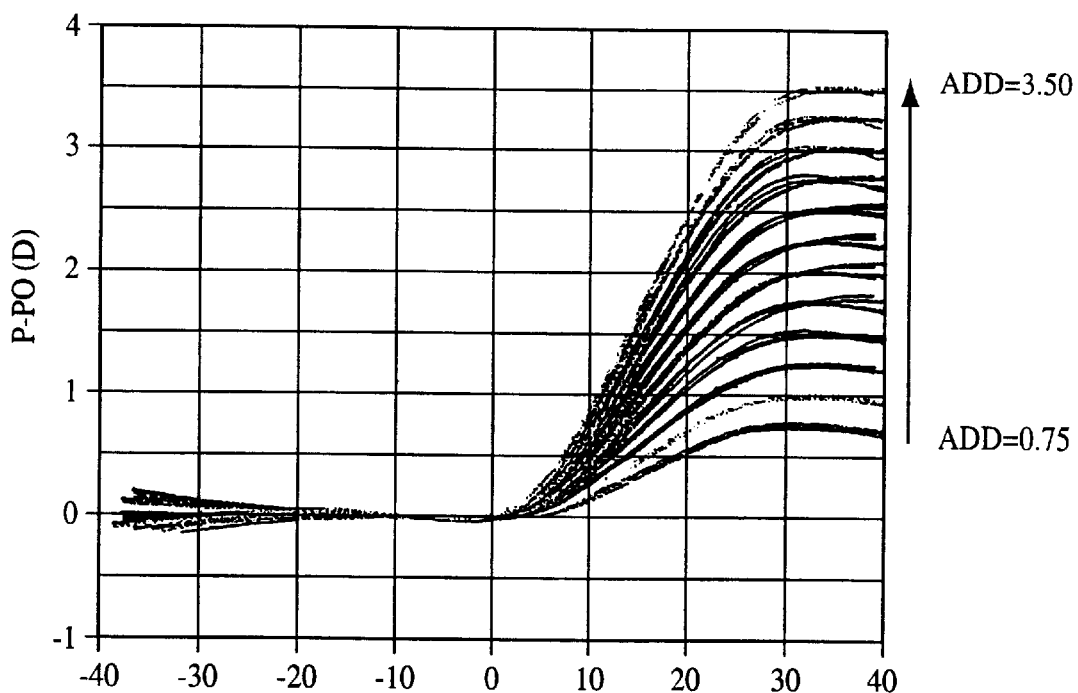
FIG. 8 shows variation in optical power along a meridian, for different power additions from 0.75 to 3.5 diopters.

FIG. 8 shows variation in optical power along the meridian, for different power additions, from 0.75 to 3.5 diopters. The x-axis on FIG. 8 shows elevation of the glance, or the angle alpha, in degrees. The y-axis shows variation in optical power compared to optical power at the reference point: this variation is zero at the reference point, located on the front face of the lens 8 mm above the geometric center, equivalent to an angle alpha of around 8°. For each power addition, FIG. 8 shows the various optimization optical powers, which are those defined above (−4.5, −1.5, 1.3 and 4.75 diopters).

It will be noted that for a given power addition, optical power along the meridian is practically identical regardless of the power at the far vision reference point, in other words the invention makes it possible to provide "optical single-design" in other words optical performance for the wearer in the intermediate space, i.e. in the lens-eye space, which is independent of the far vision power. From FIG. 8, the target values of optical power along the meridian, which are practically achieved, can be readily distinguished.

Figure 9:
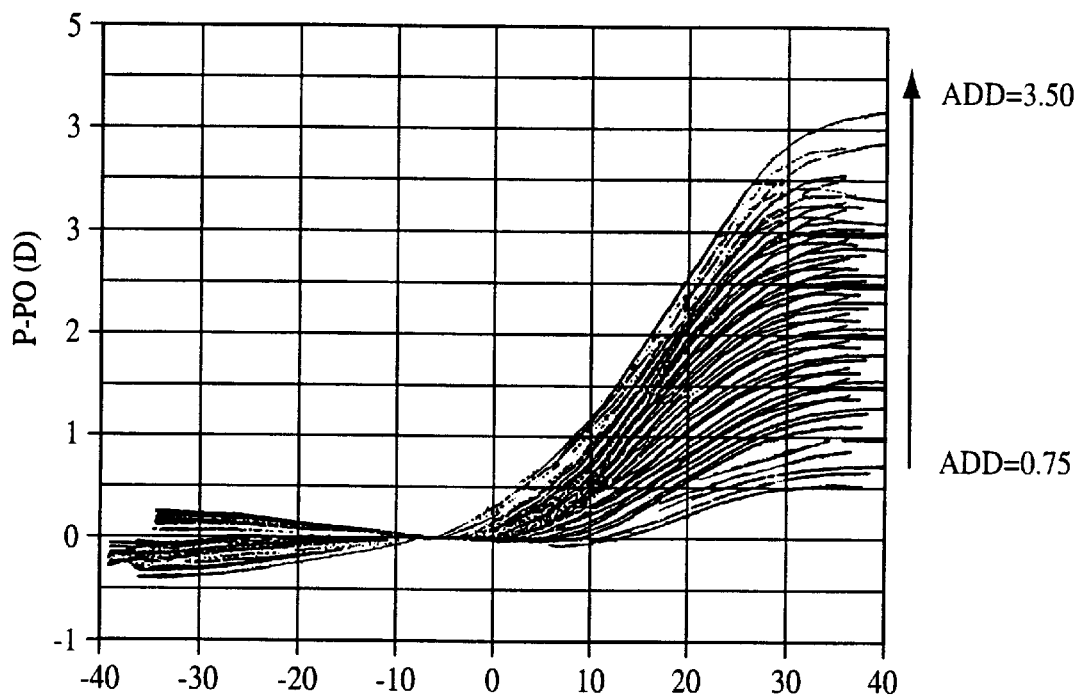
FIG. 9 shows curves corresponding to those in FIG. 8, for a prior art lens.

FIG. 9 shows, by way of comparison, a corresponding graphical representation of a prior art lens. On FIG. 9, it will be seen that there is a wider spread in the values of optical power, for a given power addition, as a function of various far vision powers. How the invention improves performance of known lenses is well illustrated here.

Figure 10:
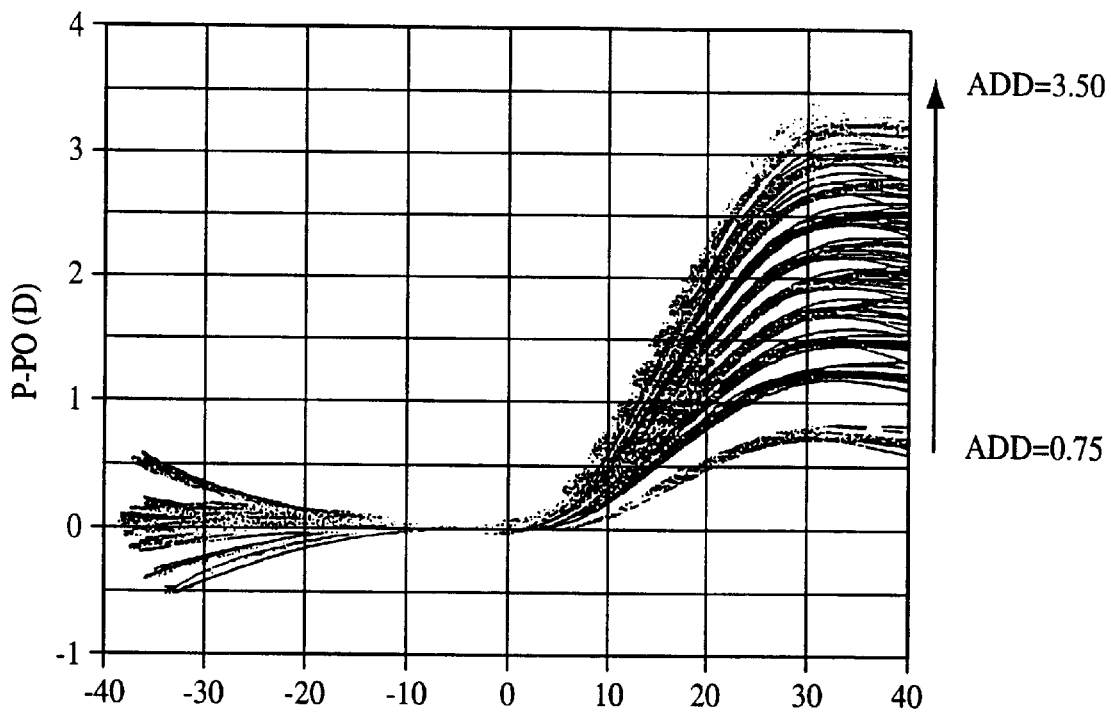
FIG. 10 is a similar view to that in FIG. 8, in which however graphical indications of wearer optical power have been added for lenses corresponding to extreme optical power for each base.

FIG. 10 is a view similar to that in FIG. 8, in which however wearer optical powers have been added for lenses corresponding to the limiting optical powers for each base, for example −2.25 and 0 diopters for the 3.5 diopter base. It will be noted in FIG. 10 that the variations in optical power along the meridian still substantially correspond to the target values in FIG. 8. In other words, the invention still yields comparable optical performance even when the rear faces employed for optimization are replaced by different rear faces.

Figure 11:
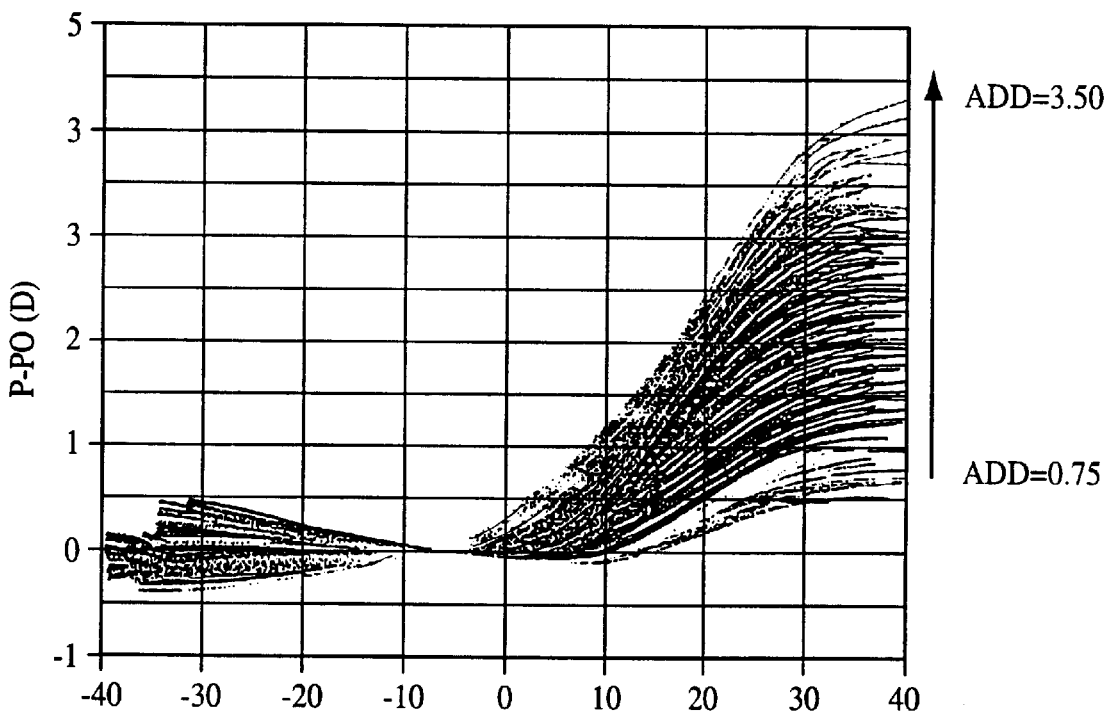
FIG. 11 shows the same graphical indications as FIG. 10 for a prior art lens.

FIG. 11 shows, by way of comparison, corresponding graphical representations for a prior art lens. On FIG. 11, it will be noted that there is a far greater spread of optical power values, for a given power addition, as a function of the various far vision powers.

Corresponding results are obtained for astigmatism aberration. One obtains notably, according to the invention, an astigmatism aberration which is below 0.2 diopters on the meridian, regardless of the far vision powers and the power addition, and for all optical powers.

Figure 12:
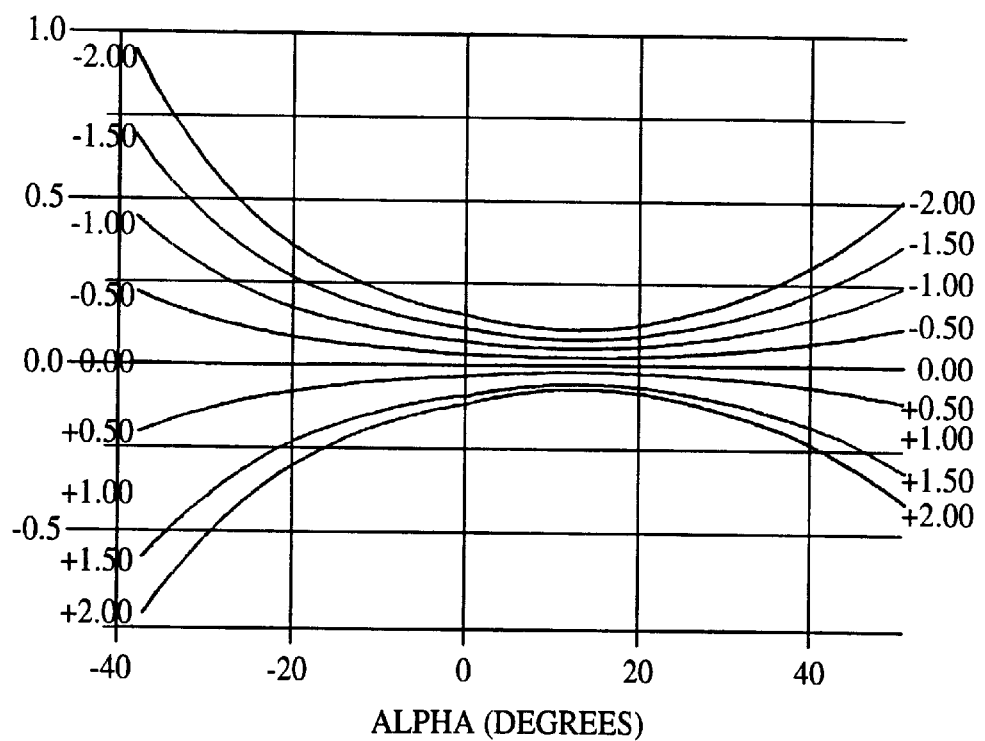
FIG. 12 shows the results obtained according to the invention, in terms of variation with respect to ergorama.

FIG. 12 shows the results obtained according to the invention, in terms of variation with respect to the ergorama. The various curves in FIG. 12 show variation in optical power along the meridian when one departs from the ergorama by a value comprised between +2.00 diopters and −2.00 diopters, in 0.25 diopter steps. The bottom curve on FIG. 12 corresponds to a difference of +2.00 diopters, and the topmost curve corresponds to a difference a of −2.00 diopters. Variations with respect to the the target optical power are shown on the y-axis, the x-axis showing elevation of glance (angle alpha), the curves in FIG. 12 corresponding to a lens according to the invention having a power addition of +3.50, and an optical power of 5 diopters at the reference point (6.2 diopter base).

From FIG. 12 it can be seen that variation in optical power remains below 0.125 diopters when deviation with respect to the ergorama is between 0 and 0.5 diopters in the far vision region (angle alpha between −300 and 0°). In the near vision region (angle alpha comprised between 20° and 40°), variation in optical power remains below 0.125 diopters, where the absolute value of the deviation from the ergorama is less than 1 diopter.

Figure 13:
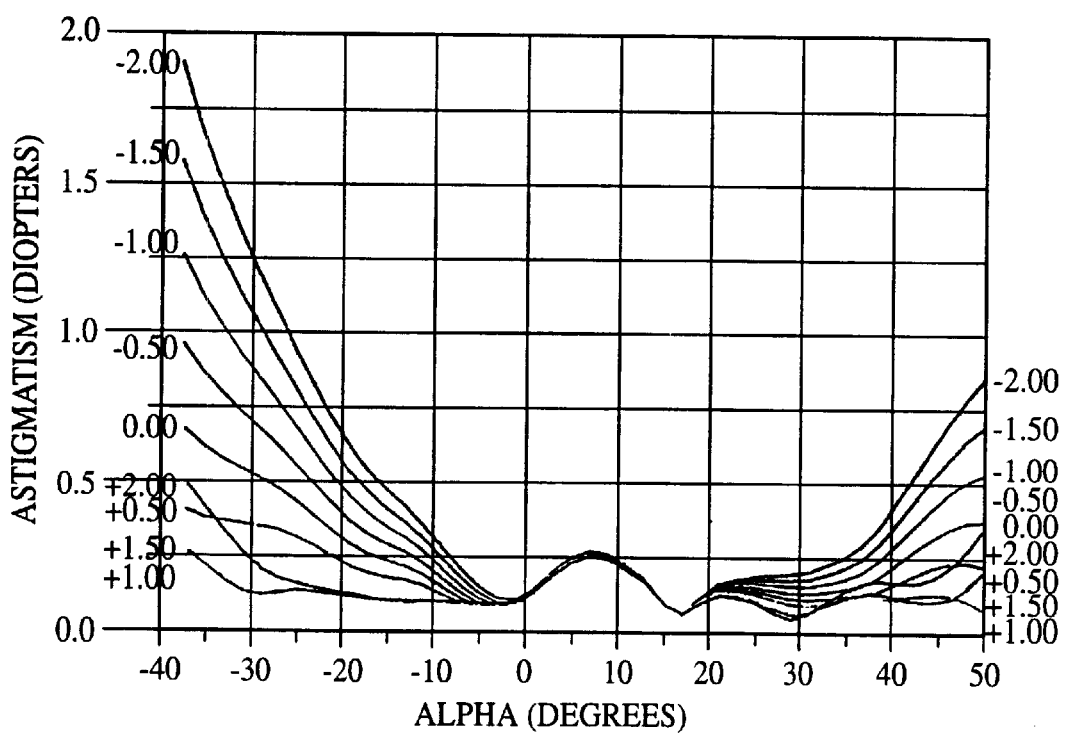
FIG. 13 shows results corresponding to those on FIG. 12, for astigmatism aberration, for the same lens.

For the same lens, FIG. 13 gives the corresponding results for astigmatism aberration. Like FIG. 12, variations in the astigmatism aberration remain low, even when there is a deviation from the ergorama used in the invention. In far vision, variations in astigmatism aberration stay below 0.125 diopters for deviations from the ergorama ranging from 0 to 0.50 diopters. In near vision, departures from the ergorama may reach 1 diopter without astigmatism aberration varying by more than 0.125 diopters.

Similar results are found in terms of the width of field at the near vision measuring point: the field width does not vary by more than 15% from a nominal value when the deviation from the ergorama is less than 1 diopter.

In far vision, the viewing area (the area within the 0.5 diopter iso-astigmatism line) does not vary by more than 15% when deviation from the ergorama is below 1 diopter.

In other words, and with respect to the target ergorama used in the definition of optical power, deviations are possible, while still ensuring optical power and astigmatism aberration, near vision field width or far vision viewing area only suffer slight variations. Even if the spectacle wearer does not have an ergorama corresponding to the one used in the invention, results from the lens of the invention remain satisfactory: comparable optical performances are provided for all optical power base values, for a given addition, while preserving simplicity of machining of the rear lens face.

FIGS. 14 to 22 show results obtained using the invention, compared with the results from prior art lenses.

On FIGS. 14 to 22, a line for optical power level (or astigmatism aberration), i.e. lines formed from points having identical optical power (or identical astigmatism aberration) are shown for a prior art lens and for lenses according to the invention. The lines are shown for values of optical power (or astigmatism aberration) increasing in 0.25 diopter steps; only integer values or half-integer values for optical power (or astigmatism aberration) are indicated on these drawings, intermediate values (0.25, 0.75, 1.25, etc) not being indicated.

The lenses are shown in a spherical coordinate reference frame, the x-axis being angle beta and the y-axis angle alpha.

Figure 16:
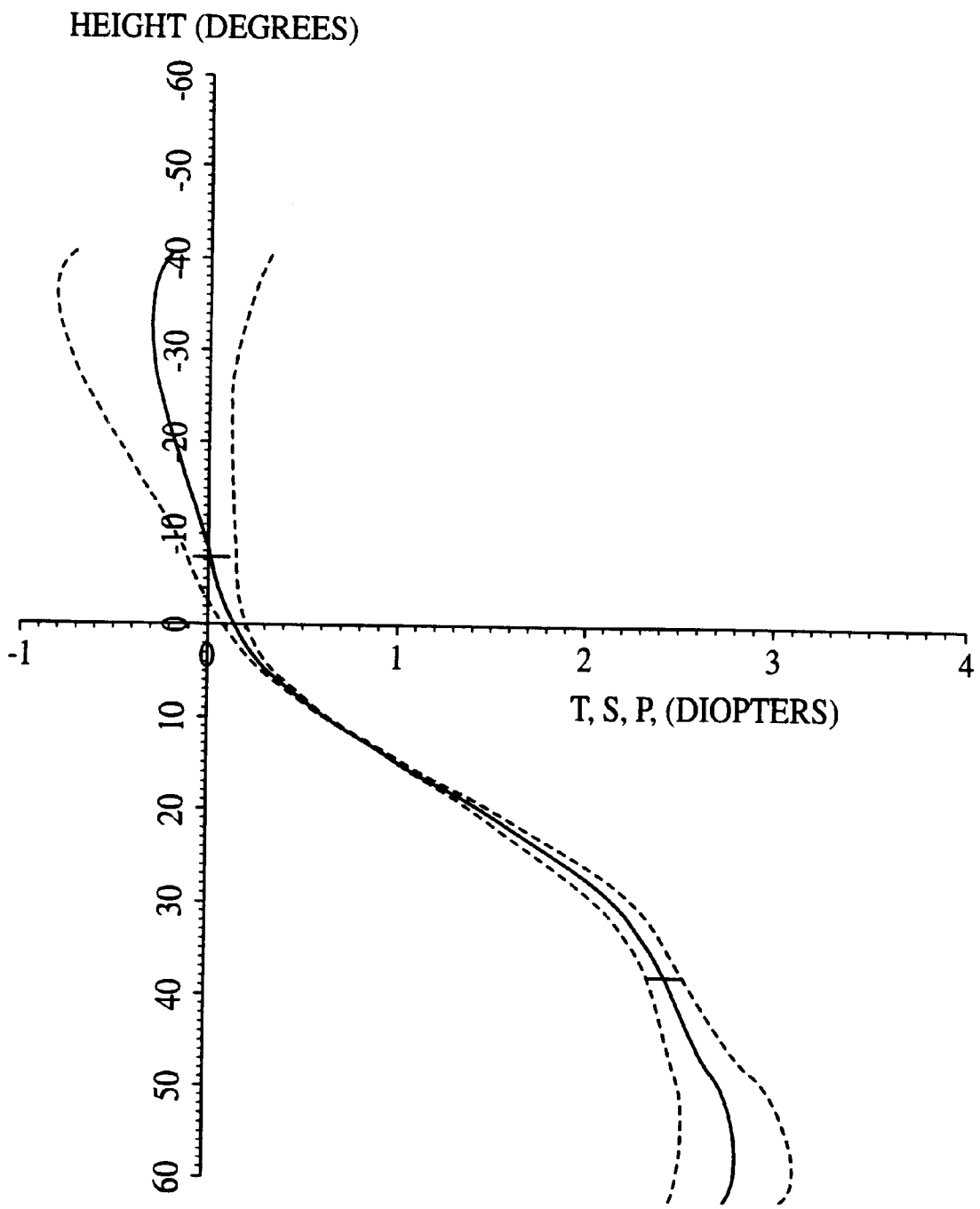
Figure 19:
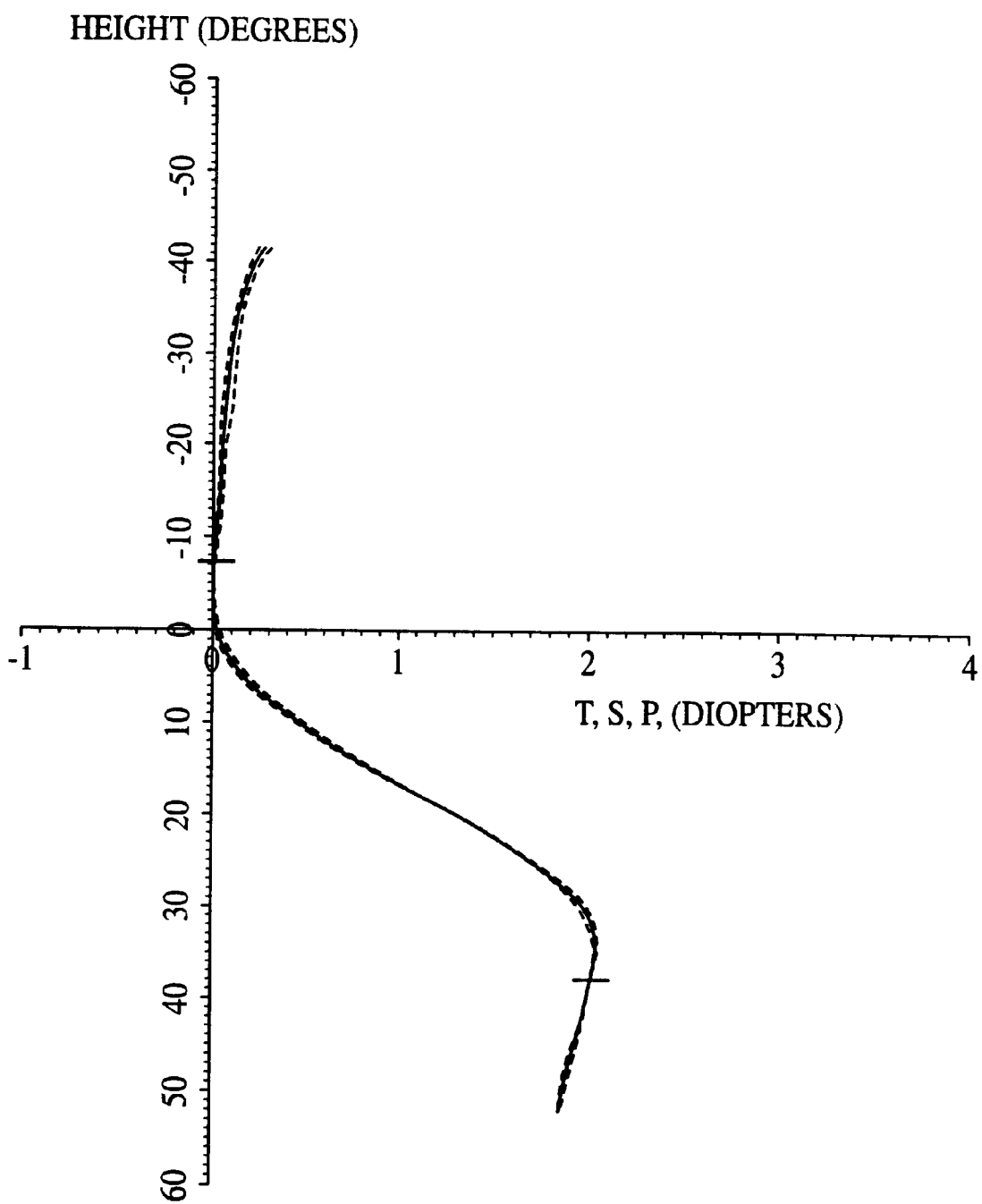
Figure 22:
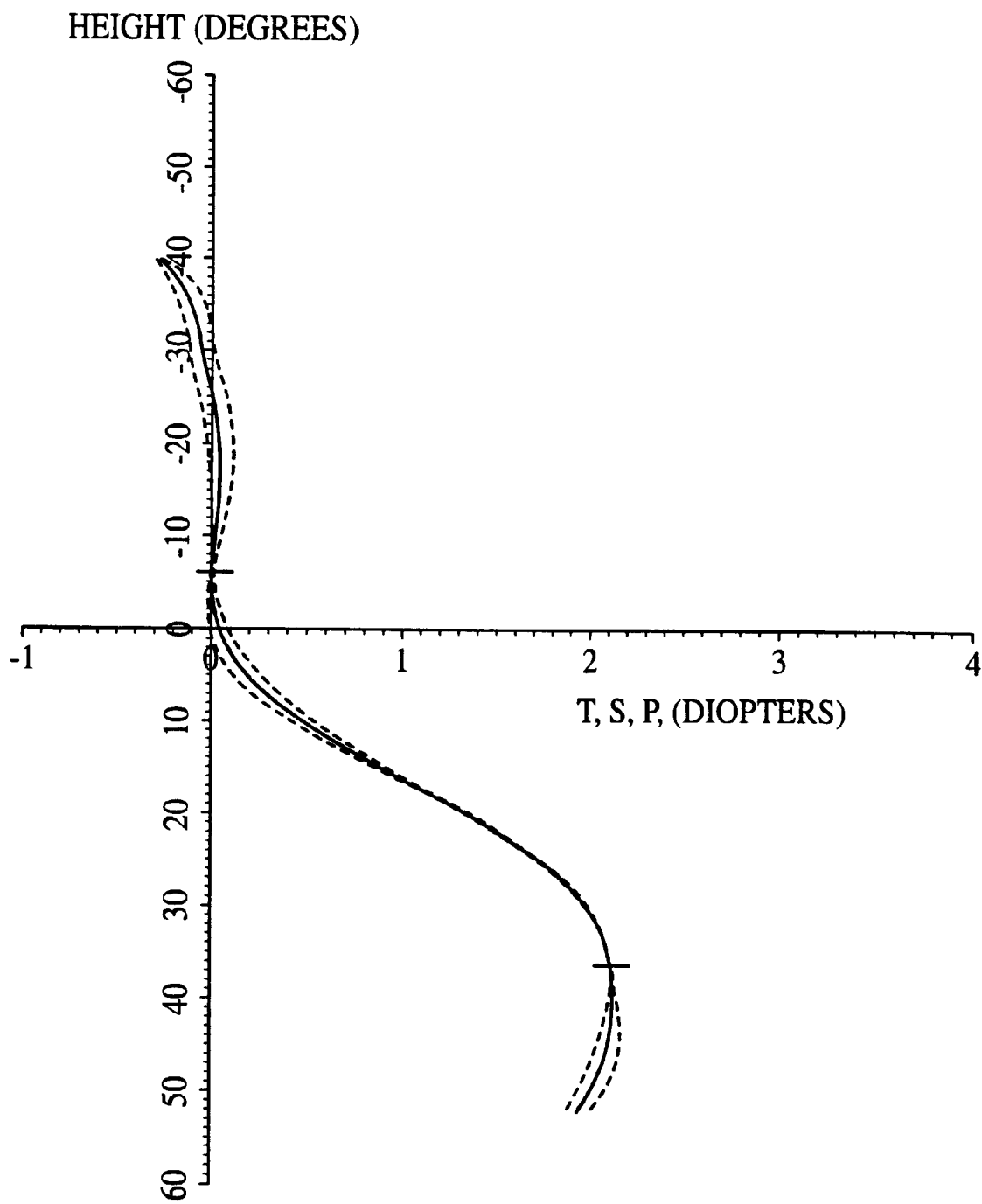

On FIGS. 16, 19 and 22, optical power along the meridian is shown in solid lines; also, the dashed lines show minimum and maximum optical power, corresponding respectively to:

the sum of the ergorama and 1/JS;

the sum of the ergorama and 1/JT.

On FIGS. 16, 19 and 22, the y-axis is the angle alpha in degrees, and the x-axis shows optical power in diopters.

Figure 14:
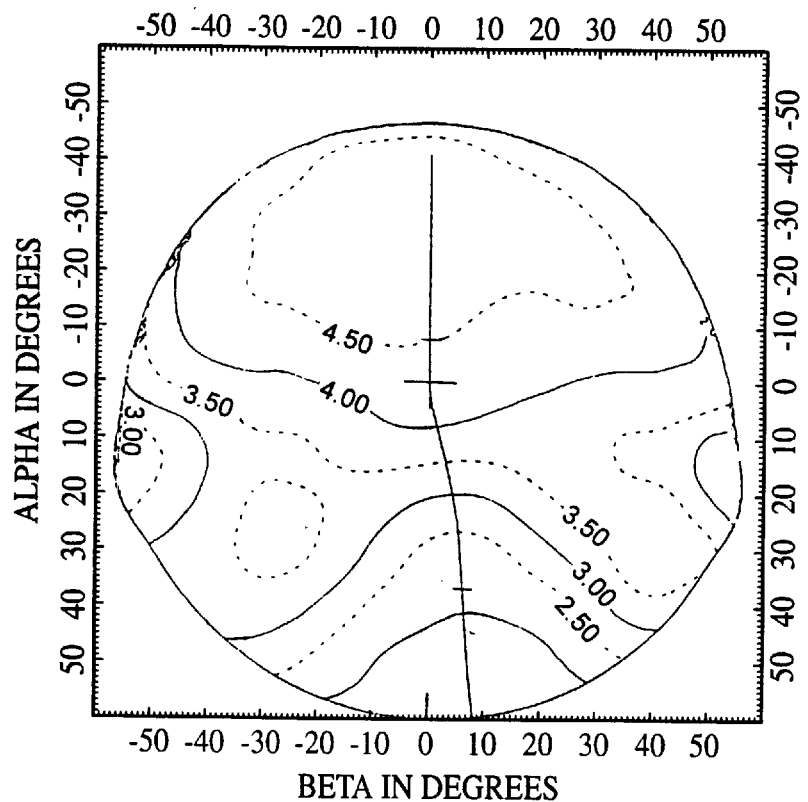
FIGS. 14 to 16 show optical power, astigmatism aberration and optical power along the meridian for a known lens.
Figure 15:
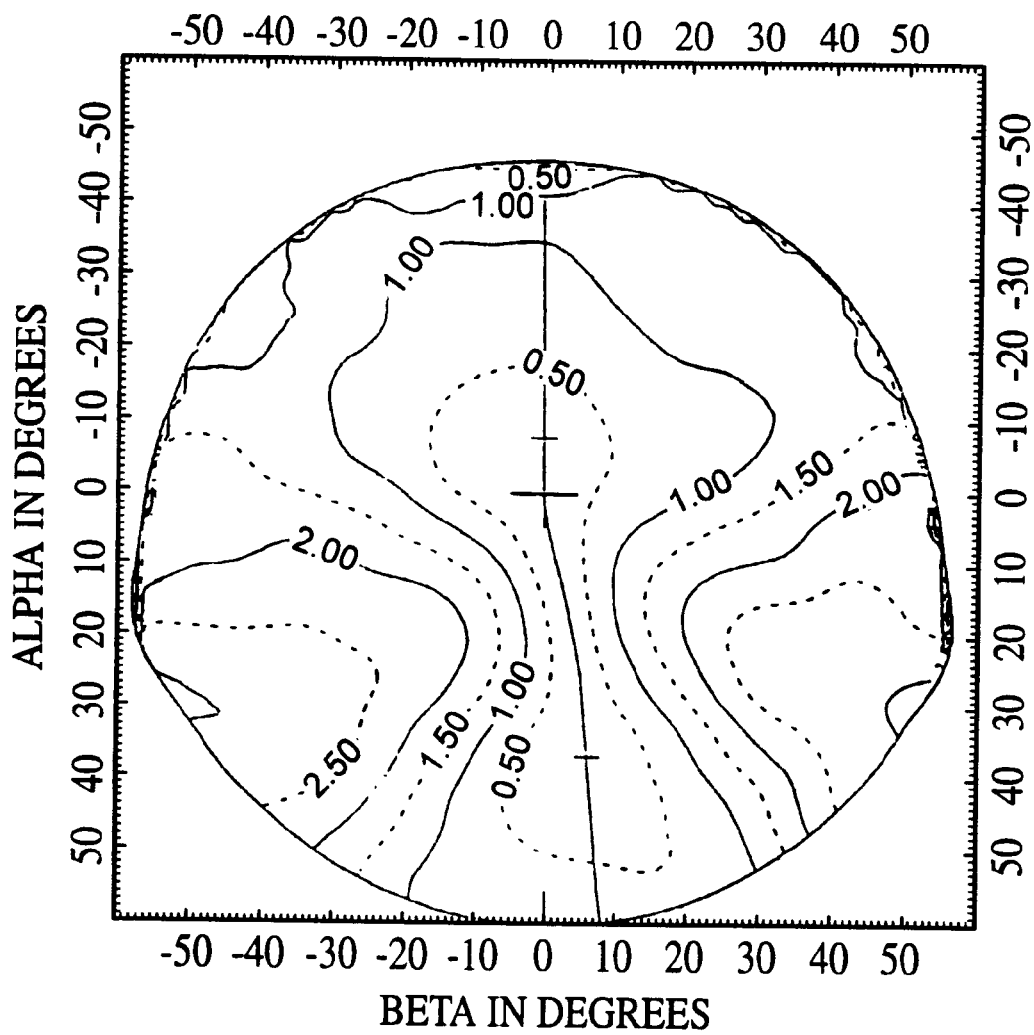

FIGS. 14 to 16 show a 70 mm diameter prior art lens; the front of this lens is a progressive multifocal surface of base 2 diopters, and 2 diopter power addition. The rear face is chosen so as to have a far vision optical power of −4.5 diopters, the lens having a prism of 1.36°. The plane of the lens is inclined with respect to the vertical by 12°, and it is 1.2 mm thick at the center. We have considered a value for q' of 27 mm as mentioned with reference to a FIG. 1.

FIG. 14 shows lines of equal optical power and FIG. 15 lines of equal astigmatism aberration.

FIG. 16 shows optical power and minimum and maximum optical power along the optical meridian. At the far vision measurement point, as indicated, optical power is −4.5 diopters. Astigmatism aberration is 0.26 diopters. At the near vision measurement point, optical power is −2.10 diopters. Astigmatism aberration is 0.19 diopters. Actual optical power addition is thus 2.4 diopters.

Figure 17:
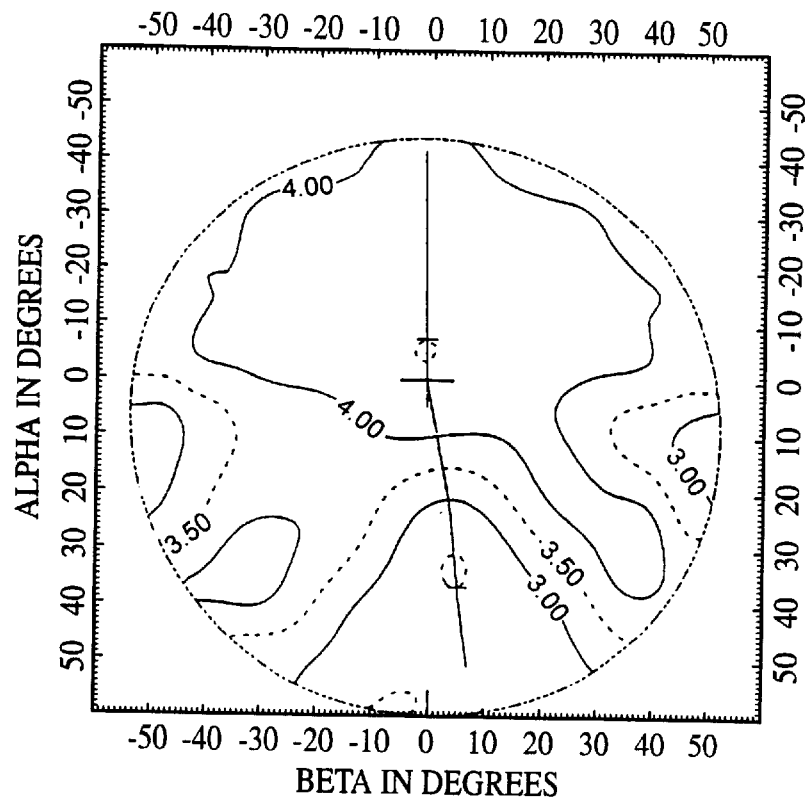
FIGS. 17 to 19 show optical power, astigmatism aberration and optical power along the meridian for a first lens according to the invention.
Figure 18:
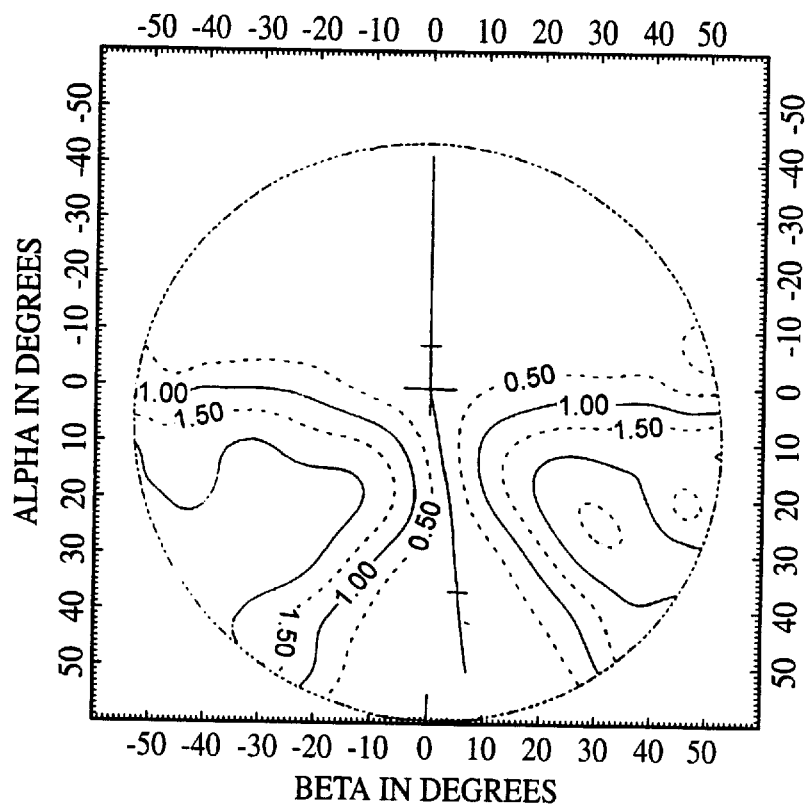

FIGS. 17 to 19 show the same corresponding views for a first lens according to the invention, of diameter 70 mm; the front face of this lens is a progressive multifocal surface of 2.0 diopter base and power addition 2.0. The rear face is chosen so as to have a far vision optical power of −4.5 diopters, and the lens has a prism of 1.36°. The plane of the lens is inclined with respect to the horizontal by 12°, its thickness at the center being 1.2 mm. We have considered the value for q' of 27 mm as mentioned with reference to FIG. 1.

FIG. 17 shows lines of equal optical power, and FIG. 18 lines of equal astigmatism aberration.

FIG. 19 shows optical power and minimum and maximum optical power along the optical meridian. At the far vision measurement point, as indicated, optical power is −4.50 diopters. Astigmatism aberration is a 0.02 diopters. At the near vision measurement point, optical power is −2.50 diopters. Astigmatism aberration is 0.01 diopters. Actual optical power addition is thus 2.00 diopters.

Figure 20:
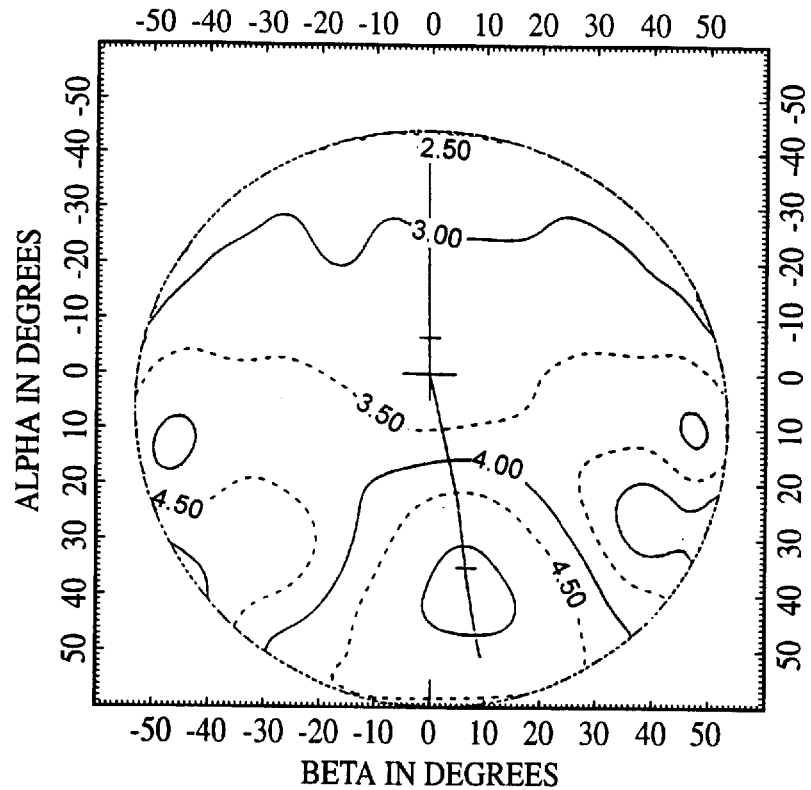
FIGS. 20 to 22 show optical power, astigmatism aberration and optical power along the meridian for a second lens according to the invention.
Figure 21:
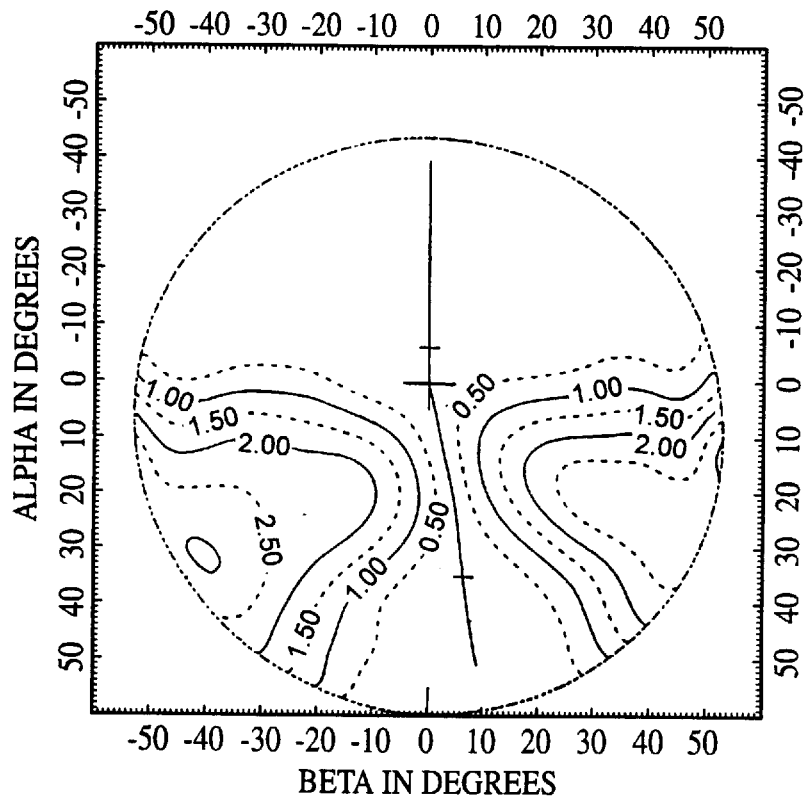

FIGS. 20 to 22 show corresponding views for a second lens according to the invention, identical to the first but however with a base of 5.3 diopters, a power addition of 2 diopters and an optical power of three diopters, and thickness at the center of 4.7 mm.

FIG. 20 shows lines of equal optical power and FIG. 21 lines of equal astigmatism aberration.

FIG. 22 shows optical power, and maximum and minimum optical power along the optical meridian. At the far vision measurement point, as indicated, optical power is 3 diopters. Astigmatism aberration is 0.02 diopters. At the near vision measurement point, optical power is 5.06 diopters. Astigmatism aberration is 0.01 diopters. Actual optical power addition is thus 2.06 diopters.

A comparison of these figures clearly shows the advantages of the invention.

Firstly, when compared to the prior art, the invention makes it possible to take good account of the different rear faces, and to obtain satisfactory results for the wearer not in terms of mean sphere and cylinder, but rather in terms of optical power and astigmatism aberration. Notably, a sharp drop in astigmatism aberration along the meridian will be noticed, the curves for optical power, minimum optical power and maximum optical power practically coinciding in the lenses of the invention. More precisely, for the two lenses of FIGS. 17 to 22 like for the other lenses of the invention, it is ensured that astigmatism aberration remains below 0.2 diopters along the meridian.

Further, the invention makes it possible to ensure, for a given power addition, practically comparable performances: FIGS. 18 and 21 have similar shapes and ensure the presence of far vision and near vision regions which are substantially identical, and which are more extensive than those in the lens of FIG. 15.

Near vision field width, in the two lenses of the invention, is respectively 24° and 26°. In the prior art lens, it is only 18°. Field with is higher in the two lenses of FIGS. 17 to 22 just like in the other lenses of the invention at 21/A+10 degrees, where A is the power addition.

Qualitatively, the invention provides a set of lenses in which optical performance of the various lenses is substantially identical for a given power addition, independently of optical power at the far vision region measurement point: this corresponds to an "optical single-design".

More precisely, according to the invention, the far vision viewing area, defined above, shows a variation of less than 15% for a given power addition, regardless of the value of optical power at the far vision region measurement point.

According to the invention, the near vision field width, also defined above, shows a variation of less than 15% for any given power addition, regardless of optical power at the far vision region measurement point.

Obviously, it is possible to reverse the front face and the rear face, i.e. to arrange for the multifocal aspherical surface of the lens to be directed towards the wearer without this modifying the invention in any way. Also, the optimization method and the starting surface can be changed or, yet again, other definitions of optical power and astigmatism aberration may be employed.

What is claimed is:

1. A set of progressive multifocal ophthalmic lenses determined by means of ergoramas that associate to each direction of glance a nearness in the object space and a power, for a given ametropia and a given addition of a standard person wearing the lens, in which, for a lens under the conditions in which it is worn, a wearer power is defined in a direction of glance and for an object point, as the sum of the the degree of nearness of an object and the degree of nearness of the image of said object point, in which each one of said lenses has:

a first and a second surface, said first surface being a progressive multifocal surface;

a far vision region, a near vision region and a main meridian of progression passing through said two regions, said far vision region, near vision region and meridian being sets of directions of glance under the wearing conditions;

a power addition A equal to a variation in wearer power for the point towards which the glance is directed in the ergorama, between a reference direction of glance in the far vision region and a reference direction of glance in the near vision region;

and in which variations in wearer power along said meridian, for the said point towards which the glance is directed in the ergorama are substantially identical for each one of the lenses of a set having the same power addition.

2. The set of lenses according to claim 1 wherein said lenses each have a prescribed power addition selected within a discrete set, a difference in power addition A between two lenses of said set having the same prescribed power addition being less than or equal to 0.125 diopters.

3. The set of lenses according to claim 1, wherein, with astigmatism aberration in a direction of glance, under wearing conditions, being defined for an object point, for each lens, along said meridian, astigmatism aberration for a point towards which the glance is directed in the ergorama is less than or equal to 0.2 diopters.

4. The set of lenses according to claims 1, wherein, with astigmatism aberration in a direction of glance, under wearing conditions, being defined for an object point, for each one of said lenses under wearing conditions, angular width in degrees between lines for which astigmatism aberration for points on the ergorama is 0.5 diopters, at 25° below a mounting cross on said lens, has a value greater than 15/A+1, A being the power addition.

5. The set of lenses according to claim 1, wherein, with astigmatism aberration in a direction of glance under wearing conditions being defined for an object point, for each one of said lenses under wearing conditions, an angular width in degrees between lines for which astigmatism aberration for points on said ergorama is 0.5 diopters, at 35° below a lens mounting cross, has a value greater than 21/A+10, A being the power addition.

6. The set of lenses according to claim 1, wherein, with astigmatism aberration in a direction of glance under wearing conditions being defined for an object point, for each one of said lenses under wearing conditions, a solid angle bounded by lines for which astigmatism aberration for points in said ergorama equals 0.5 diopter, and points situated at an angle of 45° with respect to a mounting cross on said lens has a value greater than 0.70 steradians.

7. The set of lenses according to claim 1, wherein, for each one of said lenses under their wearing conditions, wearer power difference in the far vision region, in each direction of glance, between a point towards which the glance is directed in said ergorama and object points the degree of nearness of which differs from the degree of nearness of said point towards which the glance is directed by between 0 and 0.5 diopters, is less than or equal to 0.125 diopters as an absolute value.

8. The set of lenses according to claim 1, wherein, for each one of said lenses under their wearing conditions, wearer power difference in the near vision region, in each direction of glance, between a point towards which the glance is directed in said ergorama and object points the degree of nearness of which differs from the degree of nearness of said point towards which the glance is directed by an absolute value of less than 1 diopter, is less than or equal to 0.125 diopters as an absolute value.

9. The set of lenses according to claim 1, wherein, with astigmatism aberration and direction of glance under wearing conditions being defined for an object point, for each one of said lenses under wearing conditions, a difference in astigmatism aberration in the far vision region, in each direction of glance, between a point towards which the glance is directed in said ergorama and object points the degree of nearness of which differs from the degree of nearness of said point towards which the glance is directed by between 0 and 0.5 diopters, is less than or equal to 0.125 diopters as an absolute value.

10. The set of lenses according claim 1, wherein, with astigmatism aberration and direction of glance under wearing conditions being defined for an object point, for each one of said lenses under wearing conditions, a difference in astigmatism aberration in the near vision region, in each direction of glance, between a point towards which the glance is directed in said ergorama and object points the degree of nearness of which differs from the degree of nearness of said point towards which the it glance is directed by an absolute value of less than 1 diopter, is less than or equal to 0.125 diopters as an absolute value.

11. A method for determining an ergorama for a set of progressive multifocal ophthalmic lenses, said ergorama associating, for each lens and for each direction of glance, a nearness in the object space and a power, for a given ametropia and a given addition of a standard person wearing the lens, the method comprising the steps of defining standard characteristics of a wearer, and notably ametropia and power addition;

defining an environment in the form of a set of object points to be looked at, for the standard wearer;

calculating the direction of glance for a reference object point for near vision, using a thin lens approximation, for a power calculated from said ametropia and said power addition;

calculating accommodation from the direction of glance for said reference object point for near vision and from the distance between pupils;

determining the wearer's Donders curve, from accommodation and convergence for said reference object point for near vision;

determining a direction of glance for other object points in an environment, using an iterative process, for a thin lens approximation, based on said Donders curve.

12. The method according to claim 11, wherein said step of determining the direction of glance for other object points in said environment comprises, for each one of said other points:

calculating a convergence without a lens;

calculating accommodation from the Donders curve;

calculating a power using a thin lens approximation;

repeating, to convergence to one direction of glance, the steps consisting of:
determining deviations brought about by a thin lens of the calculated power;
determining a direction of glance making it possible to compensate said deviations with said thin lens of the calculated power;
calculating a convergence from the new direction of glance;
calculating a power, using a thin lens approximation, from the new convergence and the Donders curve.

13. The method according to claim 12, wherein additionally, for each lens, a wearer power is associated with each direction of glance under wearing conditions, and wherein said wearer power is a last power calculated, using a thin lens approximation, during said steps of repetition until convergence is reached.

14. A method for defining a progressive ophthalmic lens by optimizing the optical characteristics of an ophthalmic lens, said optical characteristics being calculated during optimization using a ray tracing program, under wearing conditions.

15. The method according to claim 14, wherein said optical characteristics are a wearer power and astigmatism aberration, under wearing conditions.

16. The method according to claim 15, wherein wearer power is defined for an object point as the sum of degree of nearness of the image and the degree of nearness of an object.

17. The method according to claim 15, wherein optimization consists of minimizing, by iterations, differences between optical characteristics of the lens and target values, and wherein values of wearer power obtained according to the method of claim 14 are used as target values for wearer power.

18. The method according to claim 15, wherein optimization consists in minimizing, by iterations, differences between optical characteristics of a lens and target values, and in which use is made, as target values for astigmatism aberration, of values for astigmatism for a lens having a first known progressive surface with a surface power addition equal to a target wearer power addition for an ophthalmic lens to be defined, and a second spherical surface such that power at a far vision reference point is zero.

19. The method according to claim 15, wherein as a starting lens for optimization, a lens is employed having a first known progressive surface with a surface power addition equal to a target wearer power addition for an ophthalmic lens to be defined, and a second spherical surface.

20. The wethod according to claim 19, wherein optimization consists in varying a variable aspherical layer that is added to said starting lens.

* * * * *